(12) United States Patent
Ammann

(10) Patent No.: US 7,112,019 B2
(45) Date of Patent: Sep. 26, 2006

(54) PNEUMATIC SPINDLE WITH MEANS TO DIRECT THE BEARING AIR TOWARDS THE TOOL-HOLDING COLLET

(75) Inventor: Beat Ammann, Chiasso (CH)

(73) Assignee: Ballado Investments Inc., Panama (PA)

( * ) Notice: Subject to any disclaimer, the term of this patent is extended or adjusted under 35 U.S.C. 154(b) by 99 days.

(21) Appl. No.: 10/505,368

(22) PCT Filed: Feb. 4, 2003

(86) PCT No.: PCT/IB03/00366

§ 371 (c)(1),
(2), (4) Date: Aug. 23, 2004

(87) PCT Pub. No.: WO03/071144

PCT Pub. Date: Aug. 28, 2003

(65) Prior Publication Data

US 2005/0126804 A1    Jun. 16, 2005

(30) Foreign Application Priority Data

Feb. 22, 2002  (CH) .................................. 0316/02

(51) Int. Cl.
    *B23C 9/00* (2006.01)
(52) U.S. Cl. ................. 409/231; 409/234; 409/135; 408/240; 408/239 R
(58) Field of Classification Search ............ 409/231, 409/232, 233, 234, 135, 136; 408/239 R, 408/240

See application file for complete search history.

(56) References Cited

U.S. PATENT DOCUMENTS

| | | | |
|---|---|---|---|
| 4,276,941 A | 7/1981 | Wanner et al. | |
| 4,836,723 A * | 6/1989 | Flammini | 409/233 |
| 4,884,899 A | 12/1989 | Schwartzman | |
| 5,145,298 A * | 9/1992 | Marantette | 409/232 |
| 5,199,833 A * | 4/1993 | Fehrle et al. | 408/239 R |
| 5,322,494 A * | 6/1994 | Holtey et al. | 409/231 |
| 5,368,421 A * | 11/1994 | Head | 408/240 |
| 5,590,985 A * | 1/1997 | Mack | 408/240 |
| 5,649,795 A * | 7/1997 | Durham | 408/239 R |
| 5,771,762 A * | 6/1998 | Bissett | 409/232 |
| 6,270,087 B1 * | 8/2001 | Mickel et al. | 408/239 R |
| 6,280,124 B1 * | 8/2001 | Ammann | 408/129 |
| 6,474,656 B1 * | 11/2002 | Thomas | 408/239 R |
| 6,536,782 B1 * | 3/2003 | Rohm | 408/239 R |

* cited by examiner

*Primary Examiner*—Monica Carter
*Assistant Examiner*—Dana Ross
(74) *Attorney, Agent, or Firm*—Young & Thompson

(57) ABSTRACT

A spindle (1) in which the moving part (2) fixed to the tool-holding collet (3) is supported by one or more aerostatic bushes (4) on cushions of air generated by a jet of compressed air that circulates continuously along the air gaps (5) between the aerostatic bushes (4) and the moving part (2) and passes out of the spindle (1) through the co-axial aperture (6) formed in a flange (7) through which the tool-holding collet (3) projects from the spindle (1). Directing elements (8) are attached to the outside of the flange (7) to collect the air passing out of the abovementioned aperture (6) and cause it to adopt an outward direction of motion (E) that is tangential to or incident on the terminal part (3t) of the tool-holding collet (3) and roughly parallel to the axis of the spindle (1).

15 Claims, 2 Drawing Sheets

PNEUMATIC SPINDLE WITH MEANS TO DIRECT THE BEARING AIR TOWARDS THE TOOL-HOLDING COLLET

CROSS-REFERENCE TO RELATED APPLICATIONS

This is the 35 USC 371 National Stage of International Application PCT/IB03/00366, filed on Feb. 4, 2003, which designated the United States of America.

BACKGROUND OF THE INVENTION

The present invention relates to machine tools, and more especially those designed to drill holes at very high speeds of rotation of the tool (even exceeding 100,000 revolutions per minute).

More specifically, the invention is concerned with machine tools in which, to prevent friction between the spindle casing and the rotating parts fixed to the tool, aerostatic bushes, known to those skilled in the art, are interposed between the two. In aerostatic bushes the rotating parts are supported by cushions of air generated in the air gaps by the continuous feeding in of a jet of air which, after having travelled through the said air gaps performing its bearing function as described, passes out of the spindle through the same aperture formed in a flange mounted on the free end of the spindle, as that through which the tool-holding collet projects.

In the high-speed drilling work mentioned above, and especially where the holes are being made in materials of low specific weight such as the resins for printed circuit boards, a fine dust is thrown up, consisting of the minute chips that are generated, which is deposited in the radial slits formed in the end of the tool-holding collet to enable it to be opened and closed around a tool. This necessitates cyclical cleaning and maintenance operations, which, in view of the large total number of spindles usually used in a plant and the frequency of the drilling operations, represents a significant addition to production costs. The reason for this is that although the aforementioned jet of air passes out through the said aperture parallel to the tool-holding collet, it is then deflected by vortices generated by the very high-speed movement of the edges and sides of the collet and begins to move in a direction which has a large radial component leading away from the said collet. It cannot therefore exert any action that would keep the said fine dust away from the abovementioned radial slits.

In other words, in front of the end of the collet, a zone is generated in which the air is effectively stagnant, allowing the granules of the said fine dust to pass through it and reach and be deposited in the abovementioned slits.

SUMMARY OF THE INVENTION

The inventor of the present invention felt that this problem could be avoided if the abovementioned jet of air could be directed by suitable means to keep it alongside the tool-holding collet, before it comes away from it in a tangential direction roughly parallel to the axis of the spindle.

For this purpose he has devised the spindle according to the invention, in which directing means are attached to its flange, through which the tool-holding collet projects, which means collect the said jet of air and channel it into a direction that is tangential to or incident on the terminal part of the said tool-holding collet containing the said slits. The jet of air thus keeps the fine chip dust away from the slits, thereby achieving the object of keeping them clean.

The subject of the present invention is therefore a spindle as described below.

A more detailed description will now be given of a preferred illustrative embodiment of a spindle according to the invention. This embodiment is selected from the many embodiments available to those skilled in the art in keeping with the below teachings.

BRIEF DESCRIPTION OF THE DRAWINGS

In the course of the description, reference will also be made to the attached drawings, which show.

DESCRIPTION OF THE PREFERRED EMBODIMENTS

Figure 1:
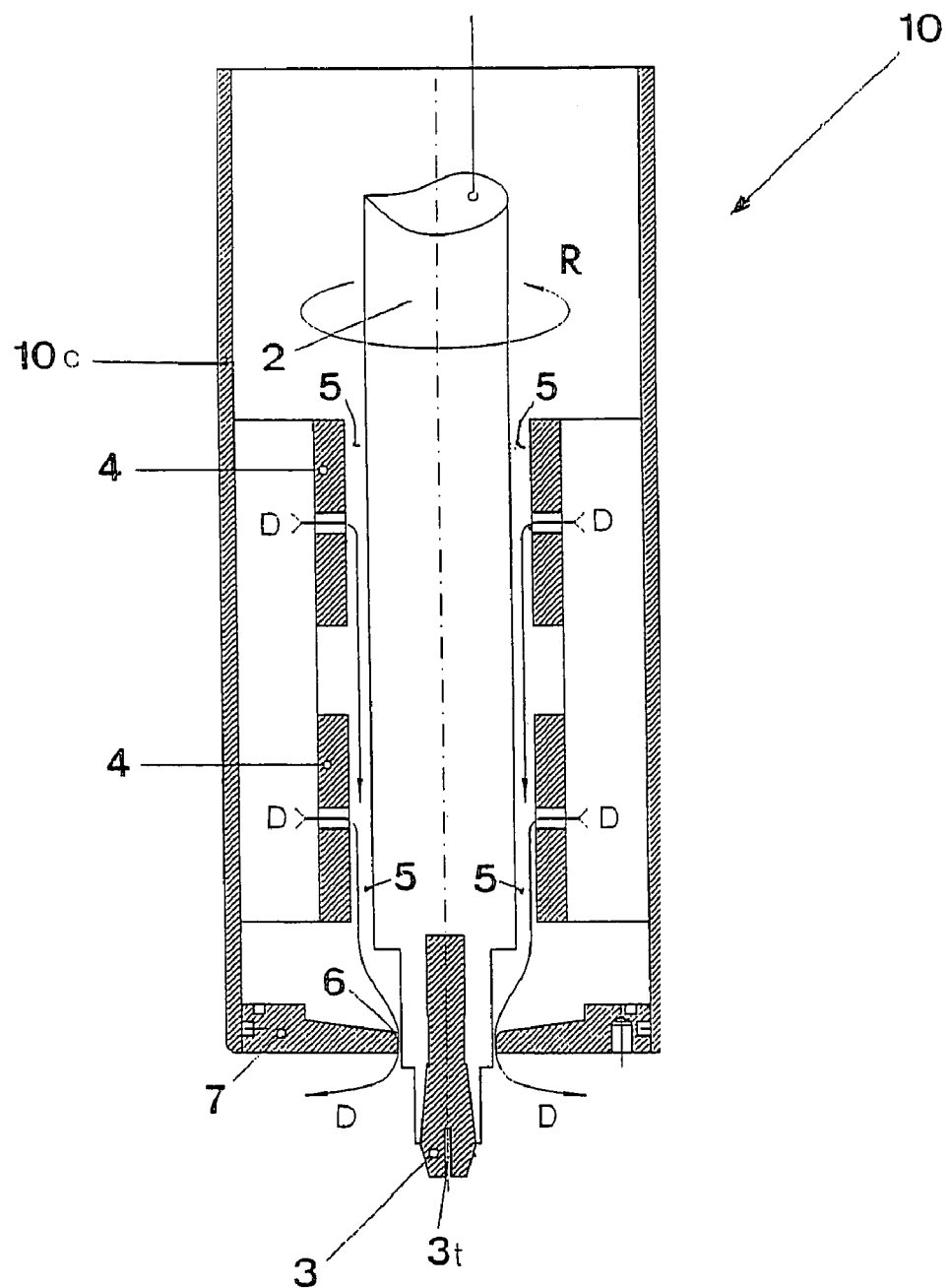
in FIG. 1, a longitudinal section through a spindle with aerostatic bushes in accordance with the prior art; and in FIG. 2, a longitudinal section through a spindle with aerostatic bushes in accordance with the invention.

Referring to FIG. 1, this shows that, in a spindle 10 in accordance with the prior art, the moving part 2, which is integral with the tool-holding collet 3 in its rotations R, is supported by two aerostatic bushes 4 via two cushions of air generated by known methods by a jet of compressed air flowing continuously (arrows D) through the air gaps 5 between the aerostatic bushes 4 and the said moving part 2. This jet of air then passes out of the spindle 10 through a co-axial aperture 6 formed in a flange 7 through which the tool-holding collet 3 protrudes from the casing 10c of the spindle 10. As can be seen in the drawing, after passing through the aperture 6, the abovementioned jet of air adopts a direction (again indicated by the arrows D) that has a significant radial component causing it to move away from the terminal part of the tool-holding collet 3 and its radial slit 3t. The jet of air cannot therefore exert any action that would keep the fine chip dust (not shown) away from the slits.

Figure 2:
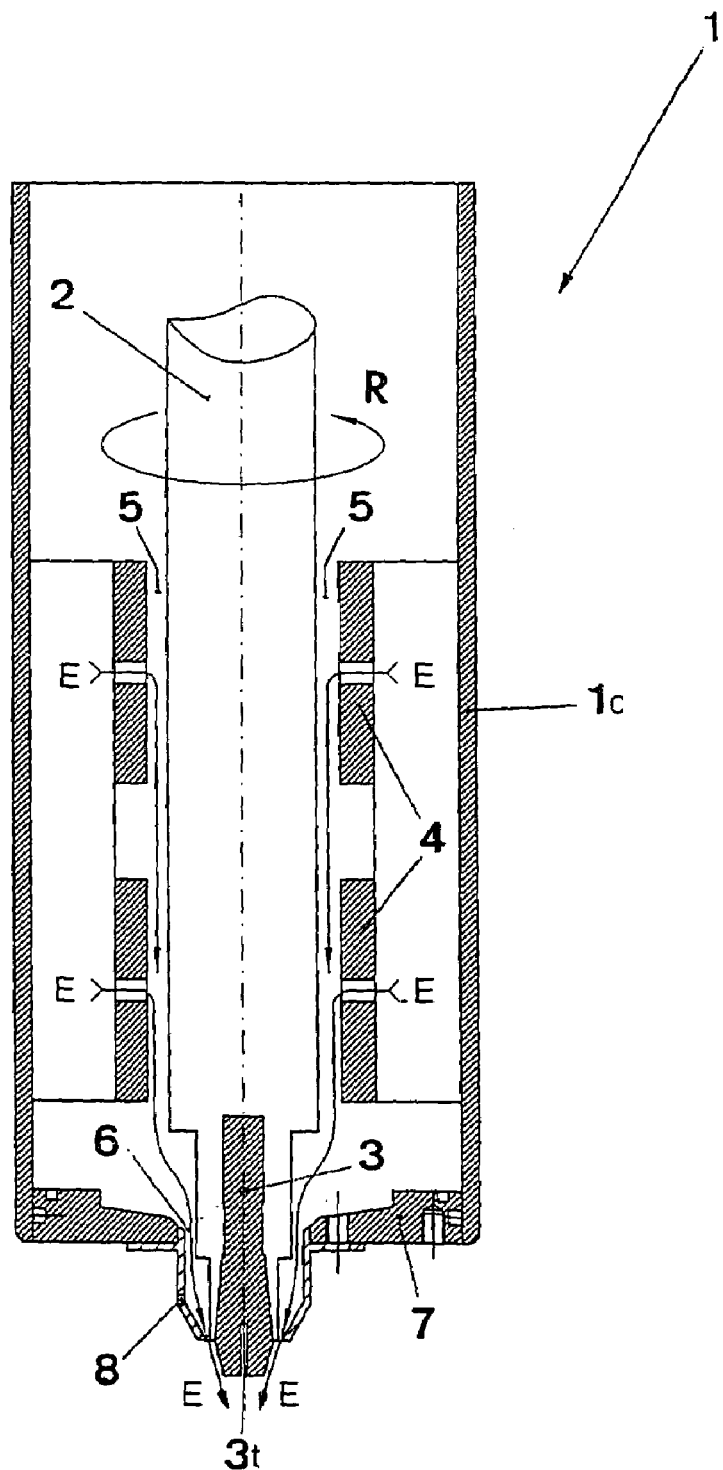

FIG. 2, on the other hand, shows a spindle 1 according to the invention, similar in type to that described earlier, and having the same component parts, namely a casing 1c and two aerostatic bushes 3 which support as illustrated the moving part 2 which is integral in its rotations R with a tool-holding collet 3 containing the said radial slits 3t. In the spindle 1 according to the invention, however, directing means, consisting here of a cap 8, are attached co-axially to the outside of the flange 7 (which is similar to that described in the previous case). These directing means collect the said jet of air (the direction of which is indicated this time by the letter E) and channel is tangentially to or in a slightly incident manner on the terminal part of the tool-holding collet 3 containing the abovementioned radial slits 3t, which collet projects out of the cap 8 to at least some degree, sufficient for its opening up to release the tool (not shown) not to be obstructed by the presence of the cap 8.

As seen in FIG. 2, as the jet of air passes out through the gap between the cap 8 and the tool-holding collet 3, it maintains a direction E that is tangential to or slightly incident on the terminal part of the collet containing the said radial slits 3t, thus preventing fine chip dust getting into the slits and being deposited in them.

The object addressed by the inventor has therefore been achieved. This object can also be achieved by using components (such as the cap 8, for example) that differ in shape and position from those described above and shown in FIG. 2.

The invention claimed is:

1. Spindle (1), comprising:
an outer case (1c) terminating at one end with a flange (7) having an aperture (6);
a moving part (2) located co-axially within the outer case and extending through the aperture;
a tool-holding collet (3) fixed to the moving part, the collet outwardly projecting from an end-most portion of the moving part;
an air directing means (8) attached to an exterior surface of the flange at the aperture and surrounding the end-most portion of the moving part,
an end-most portion of the collet extending outwardly beyond an end-most portion of the air directing means;
an aerostatic bush generating a jet of compressed air that forms a cushion of air circulating continuously along air gaps (5) located between the moving part and the aerostatic bush and exits out of the case via a path defined by the air directing means at an outlet located intermediate the end-most portion of the air directing means and the end-most portion of the moving part,
the moving part (2) supported by the cushion of air generated by a jet of compressed air, wherein,
the air directing means (8) is shaped to collect the air exiting out of the outlet in a first direction and to redirect the exiting air from the first direction to a second direction with an outward direction of motion (E) tangential to the end-most part (3t) of the collet, the redirected exiting air moving roughly parallel to an axis of the spindle (1).

2. The spindle according to claim 1, wherein,
said directing means is a shaped cap (8) fixed to the outside of the said flange (7), co-axially with respect to the tool-holding collet (3), the cap extending beyond outer most surfaces of the flange and of the case.

3. The spindle according to claim 2, wherein,
the end-most part (3t) of the collet comprises tapered converging sides, and
the air directing means (8) is shaped to collect the air exiting out of the outlet in the first direction and to redirect the exiting air from the first direction to the second direction with an outward direction of motion (E) tangential to the tapered converging sides of the end-most part of the collet.

4. The spindle according to claim 3, wherein,
an air space is defined between the air directing means (8) and the end-most portion of the moving part,
the air space has a decreasing cross section, as measured orthogonal to the axis and approaching from the flange toward the outlet.

5. The spindle according to claim 1, wherein,
said directing means is a shaped cap (8) fixed to the outside of the said flange (7), co-axially with respect to the tool-holding collet (3), the cap. having a first cylindrical portion and an attached second converging tapered portion, the cap extending beyond outer most surfaces of the flange and of the case.

6. The spindle according to claim 5, wherein,
the end-most part (3t) of the collet comprises converging tapered sides, and
the air directing means (8) is shaped to collect the air exiting out of the outlet in the first direction and to redirect the exiting air from the first direction to the second direction with an outward direction of motion (E) tangential to the converging tapered sides of the end-most part of the collet.

7. The spindle according to claim 6, wherein,
an air space is defined between the air directing means (8) and the end-most portion of the moving part,
the air space has a decreasing cross section, as measured orthogonal to the axis and approaching from the flange toward the outlet along the second tapered converging portion of the cap.

8. The spindle according to claim 1, wherein the air directing means directs the air exiting the outlet in the second direction that is converging toward the axis as the air exits the outlet.

9. Spindle (1), comprising:
an outer case (1c) terminating at one end with a flange (7) having an aperture (6);.
a moving part (2) located co-axially within the case and extending outwardly through the aperture;
a tool-holding collet (3) fixed to the moving part, the collet outwardly projecting from an end-most portion of the moving part;
an air director (8) attached to an exterior surface of the flange at the aperture, outwardly extending from the aperture, and surrounding the end-most portion of the moving part,
an end-most portion of the collet extending outwardly beyond an end-most portion of the air director;
an aerostatic bush arrangement generating a jet of compressed air forming a cushion of air circulating continuously along air gaps (5) located between the aerostatic bush arrangement and the moving part, the compressed air exiting out of the case via a path defined by the air director at an outlet located intermediate the end-most portion of the air directing means and the end-most portion of the moving part, wherein,
the air director (8) is shaped to collect the air exiting out of the outlet and to redirect the air exiting from the outlet from a first direction parallel to the axis to a second direction with an outward direction of motion (E) tangential the end-most part (3t) of the collet and converging toward the axis as the air exits the outlet.

10. The spindle according to claim 9, wherein,
said air director is a shaped cap (8) fixed to the outside of the said flange (7), co-axially with respect to the tool-holding collet (3), the cap extending beyond outer most surfaces of the flange and of the case.

11. The spindle according to claim 10, wherein,
the end-most part (3t) of the collet comprises tapered converging sides, and
the air director (8) is shaped to collect the air exiting out of the outlet in the first direction and to redirect the exiting air from the first direction to the second direction with an outward direction of motion (E) tangential to the tapered converging sides of the end-most part of the collet.

12. The spindle according to claim 11, wherein,
an air space is defined between the air directing means (8) and the end-most portion of the moving part,
the air space has a decreasing cross section, as measured orthogonal to the axis and approaching from the flange toward the outlet.

13. The spindle according to claim 9, wherein,
said air director is a shaped cap (8) fixed to the outside of the said flange (7), co-axially with respect to the tool-holding collet (3), the cap having a first cylindrical portion and an attached second converging tapered portion, the cap extending beyond outer most surfaces of the flange and of the case.

14. The spindle according to claim 13, wherein,
the end-most part (3t) of the collet comprises converging tapered sides, and
the air director (8) is shaped to collect the air exiting out of the outlet in the first direction and to redirect the exiting air from the first direction to the second direction with an outward direction of motion (E) tangential to the converging tapered sides of the end-most part of the collet.

15. The spindle according to claim 14, wherein,
an air space is defined between the air directing means (8) and the end-most portion of the moving part,
the air space has a decreasing cross section, as measured orthogonal to the axis and approaching from the flange toward the outlet along the second tapered converging portion of the cap.

* * * * *